Oct. 6, 1964 G. J. MACHACEK, JR 3,151,420
MACHINE FOR GRINDING KNIVES
Filed Jan. 17, 1963 3 Sheets-Sheet 1

INVENTOR.
GEORGE JAMES MACHACEK, JR
BY
ATTORNEY

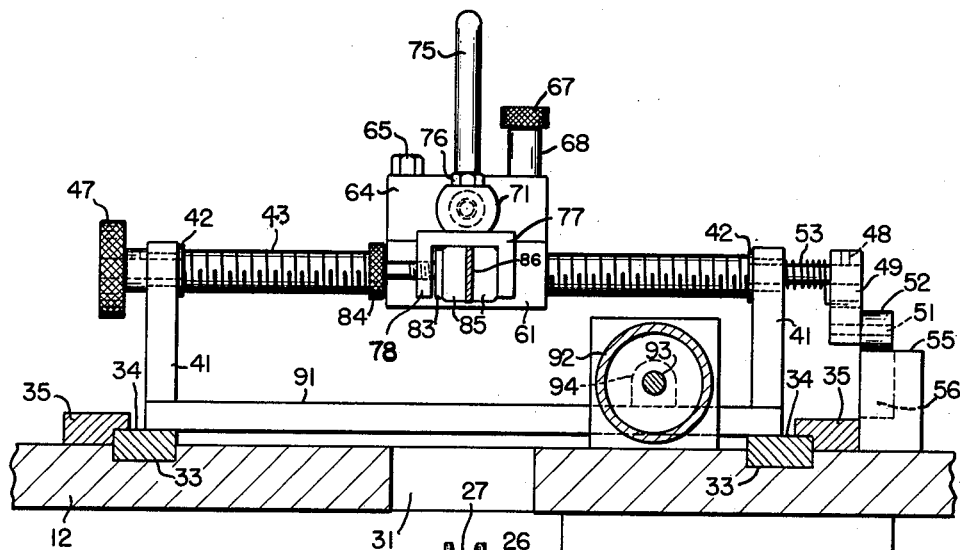
FIG. 3
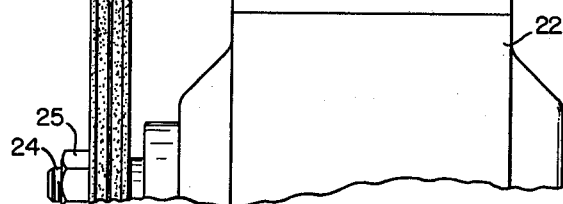
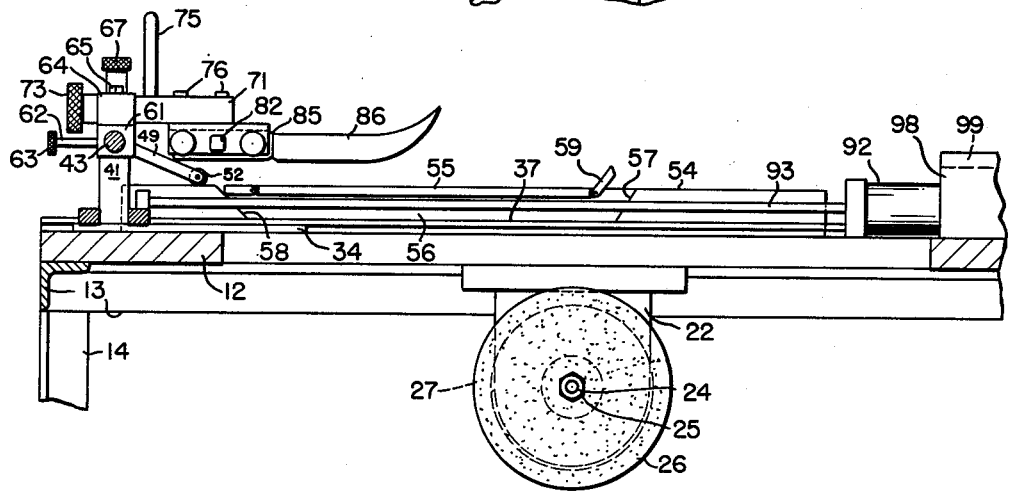
FIG. 4
INVENTOR.
GEORGE JAMES MACHACEK, JR
BY
ATTORNEY

United States Patent Office 3,151,420
Patented Oct. 6, 1964

3,151,420
MACHINE FOR GRINDING KNIVES
George James Machacek, Jr., Northfield, Minn., assignor, by mesne assignments, to Liberty National Bank and Trust Company, Buffalo, N.Y.
Filed Jan. 17, 1963, Ser. No. 252,173
13 Claims. (Cl. 51—112)

This invention relates to the sharpening of knives, and more particularly to a machine for automatically grinding the cutting edge on the knife in a particularly safe, rapid and efficient manner.

In manually grinding knives it is the responsibility of the operator to decide just when a blade has been adequately ground to the point of maximum accuracy. Much of the blade may be ground away in this operation. Furthermore manual grinding usually requires from twenty to forty-five minutes for each blade.

An object of this invention is to provide a machine for sharpening knives which will insure grinding of knives to a substantially uniform degree of excellence, and which will largely eliminate the human factor in determining the accuracy of the knife being sharpened.

Another object of the invention is to provide an automatic machine for grinding knives which will effect sharpening of a knife in but a fraction of the time required for a manual sharpening operation.

A further object of this invention is to provide a knife grinding machine which will produce a sharp edge on a steel knife blade with a minimum reduction in steel.

A further object of this invention is to provide an automatic machine for grinding knives which is relatively simple and safe to operate, and which is readily adjustable to compensate for differences in knives such as bent or twisted blades.

A further object of this invention is to provide an automatic knife grinding machine which can be used to produce a hollow ground or a straight edge on the knife blade.

Other objects of the invention will be apparent hereinafter from the specification and from the recital of the appended claims, particularly when read in conjunction with the accompanying drawings.

In the drawings:

FIG. 3 is an enlarged, fragmentary sectional view taken along the line 3—3 in FIG. 2 and looking in the direction of the arrows; and FIG. 4 is a fragmentary, side elevation similar to FIG. 2, but showing the position assumed by the knife-holder at the end of its blade grinding stroke.

Figure 1:
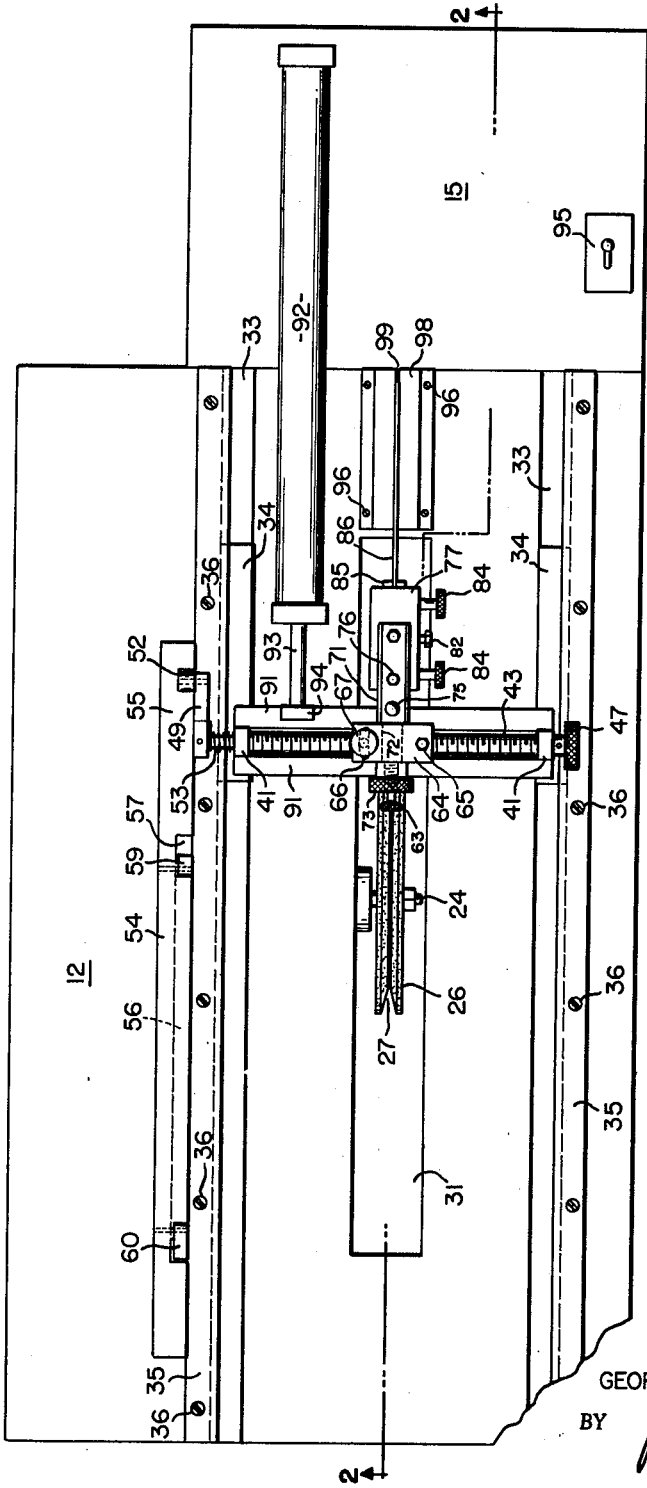
FIG. 1 is a plan view of a machine made in accordance with one embodiment of this invention.

Referring now to the drawings by numerals of reference, 11 denotes the base of the machine which comprises an elongate, horizontally disposed, rectangularly shaped bed plate 12, a rectangular angle iron frame 13 which is secured adjacent the edges of the plate 12, and four vertically disposed legs 14, only two of which are shown in FIG. 1, on which the frame is mounted. In the embodiment shown, a smaller rectangular plate 15 is supported at one end by an angle iron 16 in abutment with one end of plate 12 to project horizontally therebeyond. Plate 15 is supported at its outer end by at least one rigid, diagonal strut 17 which is secured at one end to the under side of plate 15 adjacent its outer edge, and at its opposite end to one of the vertical legs 14 of frame 11. The angle iron 16 is welded or otherwise fastened to one end of frame 13.

Secured to the underside of plate 12 substantially centrally thereof to depend therefrom is a conventional variable speed motor unit 22. Secured by a nut 25 or the like to the free end of the armature shaft 24 of the motor for rotation therewith is a conventional disc-shaped grinding wheel 26. This wheel may be provided with a peripheral V-shaped notch 27, as shown, to grind a beveled edge on a knife blade, or it may be shaped to hollow-grind the blade, or may be dressed to produce any other desired shape on a blade. Grinding wheel 26 rotates in a vertical plane, and its upper edge is positioned slightly below the bottom of plate 12.

Intermediate its ends, plate 12 has an elongate, rectangular opening 31 therethrough which registers with the grinding wheel 26. Opening 31 is substantially longer and wider than the diameter and width, respectively, of grinding wheel 26. Intermediate its ends the upper face of plate 12 is provided with two parallel, longitudinal grooves 33 which are positioned on opposite sides, respectively, of opening 31. Mounted for longitudinal sliding movement in the grooves 33 are two slide rails 34. The rails 34 are held down in the grooves 33 by gibs 35 which are secured by screws 36 to the upper face of plate 12.

Secured to the upper face of each slide rail 34 adjacent one end thereof, and projecting upwardly therefrom is a vertical post 41. Rotatably journaled in bushings 42 in the upper ends of posts 41 is a screw shaft 43. At opposite ends thereof screw shaft 43 projects axially beyond the posts 41. Secured by a set screw to one end of shaft 43 is a knurled knob 47 for manually rotating the shaft. Secured to the opposite end of shaft 43 by a set screw 48 is one end of a rigid arm 49. Rotatably mounted by means of a pin 51 on the opposite end of arm 49 is a cam follower 52. Surrounding shaft 43 between arm 49 and the adjacent post 41 is a torsion spring 53 which has one end fixed to the last-named post 41, and its other end secured in a hole (FIG. 3) in arm 49. The torsion spring 53 tends constantly to urge the roller follower 52 into engagement with the plane upper surface 54 of an elongate cam block 55 that is secured to the upper face of plate 12 in juxtaposition to the adjacent gib 34.

Cam block 55 has a plane upper surface 54, and a groove 56 in its inside lateral face, which extends for the major portion of the length of the block. The groove 56 has inclined walls 57 and 58 at opposite ends, and opens at both ends onto the upper face of the block. Gates 59 and 60 are provided to close the open ends of the cam groove. A conventional, coiled torsion spring (not shown) tends to keep gate 59 constantly open, and a similar spring (not shown) tends to keep gate 60 constantly closed.

Intermediate posts 41 shaft 43 is externally threaded. Adjustably mounted on the threaded portion of the shaft is a knife holder which comprises a block 61, which is threaded onto the shaft 43, and which is secured in position on the shaft by a set screw 62 (FIG. 2) having a knurled head 63. A rectangularly shaped block 64 is mounted for pivotal adjustment on block 61 about a pivot pin 65 which is secured in block 61. The block 64 has therethrough adjacent its opposite end an arcuate slot 66. A setscrew 67 has a shoulder portion 68 which bears on the upper surface of the block 64, and a threaded shank portion (not illustrated) which passes through slot 66 and is threaded into block 61. Thus, block 64 may be pivotally adjusted on block 61 about screw 65 within the limits afforded by the arcuate length of slot 66.

Mounted on block 64 is a bar 71. Adjacent its rear end, the left end in FIGS. 1 and 2, bar 71 has a reduced diameter portion which extends through a hole 72 (FIG. 1) in block 64. The bar 71 is secured on block 64 by a knurled nut 73 which is adapted to be threaded tightly against the block 64.

At its forward end (to the right of block 64 in FIGS. 1 and 2) the upper and lower surfaces of rod 71 are flatted off. Secured at one end to the upper surface of bar 71 is a pin 75 which is adapted to function as a handle as below described.

Secured by screws 76 to the lower face of bar 71 is an inverted, generally U-shaped bracket 77. Mounted in one leg 78 of bracket 77 is a clamp which comprises an elongate plate 83 (FIG. 3) disposed within the bracket, a guide pin 82 which extends through this leg of the bracket, and a pair of knurl-headed adjusting screws 84 which thread through openings in the bracket leg 78 at opposite sides of the guide pin 82 and which are secured at their inner ends to the plate 83. The screws serve to adjust plate 83 into gripping engagement with the handle 85 of a knife 86 that is to be sharpened.

Secured to opposite sides of the posts 41 to extend transversely of and to connect rails 34 are two bars 91. Mounted at opposite ends to the upper faces of the plates 12 and 15 is a stationary, hydraulic cylinder 92 having a piston reciprocable therein that has a piston rod 93 projecting from one end thereof. Rod 93 has its outer end secured by a block 94 to one of the bars 91. Cylinder 92 is connected by a conventional hydraulic system (not illustrated) to a conventional valve 95 which is mounted on plate 15, and which is shiftable manually in opposite directions to cause rod 93 to effect reciprocation of the slide rails 34, and hence of the knife holder.

Secured by screws 96 to the top of plate 12 is a knife blade aligning block 98. Block 98 has a narrow groove 99 extending longitudinally across its upper face in a vertical plane. As shown more clearly in FIGS. 1 and 2, the groove 99 in block 98 is adapted to accommodate the blade 86 of the knife when the latter is reciprocated into one of its extreme positions by the knife holder 60.

In use the handle 85 of a knife 86 is secured in bracket 77 as illustrated in the drawings. To accomplish this, the knife is first moved to its extreme right hand position as illustrated by solid lines in FIGS. 1 and 2; and block 71 is adjusted so that the knife 86 registers in the groove 99 in block 98. To align the knife 86 with the groove 99, the set screws 48 and 62 are loosened to permit the rotation of shaft 43 relative to the block 61; and the set screw 67 and nut 73 are also loosened to permit pivotal movement of block 71 about screw 65. Shaft 43 may be rotated by knob 47 to shift the knife holder laterally on shaft 43 until the knife 86 is substantially in line and registers with the groove 99 in block 98, the pin 75 being employed at this time to pivot the knife holder slightly counter-clockwise from its full line position in FIG. 2. If necessary, the block 71 is rotated in bore 72. Set screws 48, 62, 67 and nut 73 are then tightened, and the knife 86 will now be in alignment with the groove 27 in the grinding wheel 26.

Figure 2:
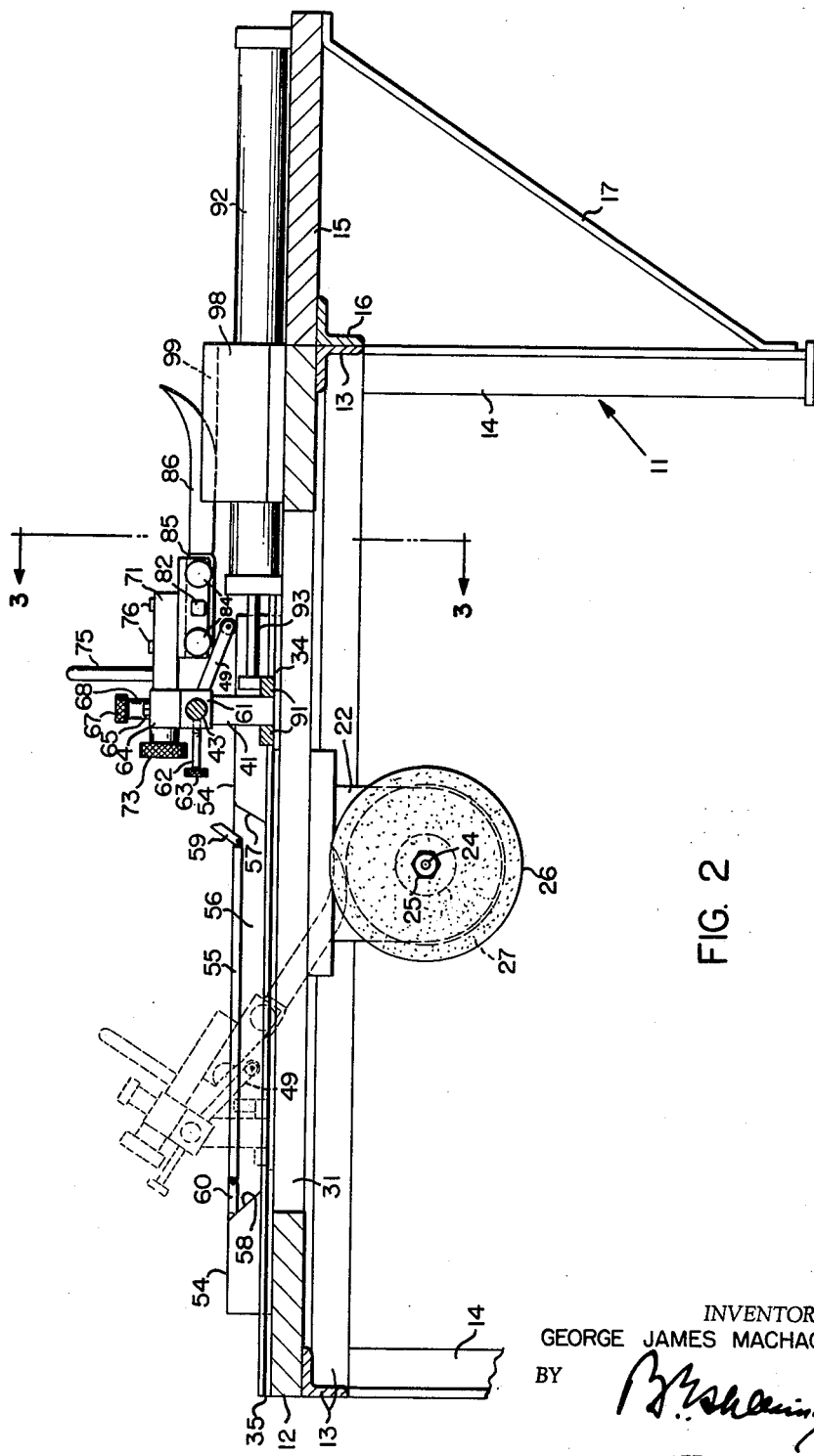
FIG. 2 is a sectional view taken along the line 2—2 in FIG. 1 and looking in the direction of the arrows, and showing in broken lines the position assumed by the knife-holder midway of the blade grinding stroke.

The valve 95 controlling the hydraulic system is then shifted to cause piston rod 93 to move toward the left in FIGS. 1 and 2. During this movement, the roller 52 rolls over the plane upper surface of the cam block until it registers with the opening at the right hand end of the cam groove 56. The normally-open gate 59 directs the roller into the open right hand end of the cam groove 56; and spring 53 causes the roller to roll off the upper surface 54 of cam block 55 downwardly over the inclined surface 57 at the right hand end of the cam groove. As the roller follower 52 enters groove 56, arm 49 is pivoted thereby causing shaft 43 and the entire knife holder to pivot clockwise in FIG. 1 pivoting the knife 86 downwardly through the opening 31 in plate 12 into engagement with the groove 27 in the grinding wheel 26. As the knife holder 60 continues toward the left in FIGS. 1 and 2, the cam roller follower 52, which is smaller in diameter than the height of the cam groove 56, rides between the top and bottom of groove 56; and the spring 53 causes the knife 86 resiliently to engage in the groove 27 of the rotating grinding wheel 26 and to be drawn through the groove of the wheel so that opposite sides of the knife are ground between the side walls of the groove.

In FIG. 2 the knife holder is shown by broken lines in the position which it assumes just before the knife becomes disengaged from the grinding wheel 26 near the completion of a sharpening stroke.

As the knife holder progresses further to the left the roller follower 52 rides up the inclined cam surface 59 at the left hand and of groove 56, and engages and passes through the spring loaded gate 60 onto the plane top surface 54 of the cam block again. After the roller follower 52 has passed through gate 60, the latter is returned to the position illustrated in FIGS. 1 and 2 by action of the conventional torsion spring (not illustrated) associated with the gate.

The flow of hydraulic fluid in cylinder 92 is then reversed by shifting valve 95 so that piston rod 93 is moved to the right in cylinder 92 until the knife holder once again assumes the position illustrated in full lines in FIGS. 1 and 2. During this return movement the cam follower 52 rides on top of the normally-closed gate 60, over the central portion of surface 54, and against gate 59 closing this latter gate against the action of its spring, and back onto the right hand portion of surface 54 again. When the piston rod 93 has been retracted to its innermost position in cylinder 92, the flow of the hydraulic fluid in cylinder 92 can once again be reversed by shifting valve 95 so that the piston rod 93 once against moves toward the left in FIGS. 1 and 2 to initiate another sharpening cycle.

From the foregoing it will be apparent that applicant has provided a knife sharpener which essentially eliminates any of the human error heretofore encountered when knives of the type described were sharpened by drawing them manually across a grinding wheel. The set-up time for mounting and dismounting the knife in applicant's machine amounts to but a minute or so, while the average length of actual grinding time is a matter of seconds. For ordinary sharpening operations one passage of the knife blade through the groove of the grinding wheel will suffice to effect the grinding operation. The time of sharpening with the machine of the present invention compares very favorably with the twenty to forty-five minutes heretofore required to grind knives manually. Moreover, because the position of the blade is controlled during grinding by the cam groove 56, possibility of human error is eliminated; and applicant's machine substantially reduces the amount of the knife which must be ground away to provide a satisfactory edge. In addition, since the aligning block 98 aligns the blade 86 of each knife with the groove 27 in the grinding wheel 26, sharpening of different knives will be relatively uniform.

Moreover, applicant's machine has an inherent safety feature in that the knife need be handled by the operator only during the mounting and dismounting thereof in the knife holder, while the actual sharpening of the knife occurs below the level of plate 12. Also, in the event that some of the knives, which are to be sharpened, have become bent or twisted relative to their respective handles 85, the several adjustments permitted upon the loosening of set screws 48, 52 and 67, and the nut 73 afford the operator a ready means for adjusting a knife so it will align with the groove 99 in the aligning block 98 and will be sharpened correctly.

It is to be understood that the groove 27 in the grinding wheel 26 may be formed so as to produce a hollow ground or straight edge on a respective knife blade and that the speed of the grinding wheel and the reciprocatory movement of the knife holder may be varied as desired to provide a grinding stroke which is most suitable to the particular knife being sharpened.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A machine for sharpening knives, comprising
   (a) a frame,
   (b) a grinding wheel rotatably mounted on said frame,
   (c) a stationary guide block spaced from said wheel and having across its face a groove which is bisected by a plane normal to the axis of said wheel centrally thereof,
   (d) a knife holder mounted on said machine for reciprocatory movement toward and away from said block,
   (e) means for removably securing a knife to said holder,
   (f) means for adjusting said holder relative to said block so that the blade of the knife is disposed in said plane and slides into said groove, and
   (g) means for reciprocating said holder to move a knife carried thereby in said plane into engagement with and across said grinding wheel.

2. A machine for sharpening knives, comprising
   (a) a frame,
   (b) a grinding wheel rotatably mounted on said frame,
   (c) a shaft mounted on said frame for oscillation about an axis parallel to the axis of rotation of said wheel, and for reciprocatory movement in a rectilinear path extending transverse to and offset from said axis,
   (d) means for removably securing a knife to said shaft, and
   (e) means to oscillate said shaft at least once for each reciprocation of said shaft to move a knife carried thereby into and out of engagement with the peripheral surface of said wheel.

3. A machine as defined in claim 2 wherein said means to oscillate said shaft comprises
   (a) a cam mounted on said frame adjacent said shaft and
   (b) a follower removably secured to said shaft and engageable with said cam during the reciprocatory movement of said shaft to impart oscillatory motion to the latter in accordance with the shape of said cam.

4. A machine for sharpening knives, comprising
   (a) a frame,
   (b) a grinding wheel rotatably mounted on said frame,
   (c) a shaft mounted on said frame for reciprocatory movement in a direction transverse to and offset from the axis of said wheel,
   (d) means for removably securing a knife to said shaft,
   (e) means to oscillate said shaft to move a knife carried thereby into and out of engagement with said wheel, the axis of said shaft extending parallel to the axis of said wheel, and the first-named means comprising
   (f) a first member mounted on said shaft for axial adjustment therealong,
   (g) a second member pivoted on said first member for limited pivotal adjustment thereon about an axis perpendicular to the axis of said shaft,
   (h) a third member having one end thereof rotatably adjustable in a bore in said second member about an axis which extends transverse to said shaft axis and perpendicular to the second-named axis and
   (i) a clamp secured to the opposite end of said third member to grip a knife.

5. A machine for sharpening knives, comprising
   (a) a knife holder,
   (b) a grinding wheel mounted for rotation about a stationary axis,
   (c) means for reciprocating said holder relative to said wheel along a path spaced from said wheel,
   (d) a cam extending in the direction of reciprocation of said holder,
   (e) means connecting said holder to said cam and operative to cause said holder to move the blade of a knife carried thereby from an inactive position and into engagement with said wheel during the movement of said holder from one to the other of its extreme positions of reciprocation, and to move said blade into an inactive position at the end of said movement, said cam comprising
   (f) an elongate block having in one side thereof a longitudinally extending groove which opens at opposite ends thereof onto the upper surface of said block,
   (g) a pair of gates movably mounted on said block and adapted when closed to bridge the openings in the opposite ends of said groove, one of said gates being normally open, and the other of said gates being normally closed, and said connecting means in- including
   (h) a cam follower which moves off said upper surface and into said groove through said normally open gate at the beginning of said movement, through said normally closed gate and back onto said upper surface at the end of said movement, and which, during the return movement of said holder from said other to said one position, remains on said upper surface by passing from one end thereof over said normally closed gate, and then into engagement with said normally open gate thereby temporarily to close the latter and pass thereover onto the opposite end of said surface.

6. A machine for sharpening knives, comprising
   (a) a frame,
   (b) a grinding wheel mounted on said frame for rotation about a fixed axis,
   (c) a stationary guide block spaced from said wheel and having a groove extending across its face,
   (d) a carier mounted on said frame for reciprocation past said wheel and toward and away from said guide block,
   (e) a knife clamp,
   (f) means for adjustably mounting said clamp on said carrier so that a knife gripped by said clamp will be positioned in said groove when the carrier is reciprocated into one of its extreme positions, and
   (g) means operative during the movement of said carrier away from said one position to move said clamp relative to said carrier to an active position in which a knife gripped in said clamp is engaged with said wheel, and operative duirng the movement of said carrier toward said one position to move said clamp to an inactive position in which said knife is disengaged from said wheel, and
   (h) means for resiliently urging the clamp in a direction to engage the knife resiliently with the wheel when the clamp is in active position.

7. A machine for sharpening knives, comprising
   (a) a frame,
   (b) a pair of spaced, parallel shafts mounted on said frame,
   (c) drive means for creating relative reciprocatory movement between said shafts,
   (d) a grinding wheel secured on one of said shafts to rotate coaxially thereof,
   (e) a clamp for gripping a knife,
   (f) means mounting said clamp on the other of said shafts for movement between an operative position in which a knife carried by said clamp is engaged with said wheel, and an inoperative position in which said knife is disengaged from said wheel, and (g) cam means connected to said mounting means and operative during said reciprocatory movement to cause said clamp to move to said operative position for a predetermined period of time.

8. A machine as defined in claim 7 wherein
(a) said one shaft is mounted to rotate about a stationary axis,
(b) said other shaft is reciprocable in response to said drive means relative to said one shaft, and
(c) said cam means is connected to said other shaft to impart oscillatory movement thereto thereby to pivot said clamp between said operative and inoperative positions.

9. A machine as defined in claim 7 wherein said mounting means comprises
(a) a first member mounted on said other shaft for axial adjustment therealong,
(b) a second member pivoted at one end on said first member, and
(c) a third member connected at one end to said second member and at its opposite end to said clamp,
(d) said first, second, and third members being adjustable to position said clamp so that a knife gripped thereby is disposed in a plane which extends through said wheel intermediate the ends thereof when said clamp is in said active position.

10. A machine for sharpening knives, comprising
(a) a frame,
(b) a rigid plate supported in a horizontal position on said frame and having an elongate slot therethrough,
(c) a rotatable grinding wheel suspended beneath said plate with its grinding surface registering with said slot intermediate the ends thereof,
(d) a clamp for gripping the knife,
(e) means mounting said clamp above said plate to reciprocate over said wheel, and longitudinally of said slot, and
(f) cam means connected to said mounting means and operative, during the reciprocation of said clamp, to move said clamp downwardly so that a knife held thereby is moved downwardly through said slot and into engagement with said grinding surface of said wheel.

11. A machine as defined in claim 10 wherein
(a) a guide block is secured to the top of said plate at one end of said slot and has across its upper face a groove which is aligned with said slot, and said mounting means includes
(b) a reciprocable member movable toward and away from said block in a direction extending parallel to said groove, and
(c) means for adjusting said clamp on said member so that a knife held by said clamp will seat in said groove when said member is in one of its extreme positions of reciprocation.

12. A machine for sharpening knives comprising
(a) a frame,
(b) a rotatable grinding wheel mounted on said frame and having a circumferential groove in its peripheral surface,
(c) a slide mounted on said frame for reciprocable rectilinear movement in a direction transverse to the axis of said wheel,
(d) a shaft carried by said slide to pivot about an axis parallel to the axis of rotation of said wheel,
(e) a guide block mounted on said frame in the path of said slide and having across its face a groove which lies in a plane containing the groove in said wheel,
(f) means adjustably mounting a knife clamp on said shaft for pivotal movement therewith,
(g) and cam means connected to said shaft and operative to pivot said shaft and said clamp as a unit between an inactive position in which a knife held by said clamp is seated in said groove in said block when said slide is in one of its extreme positions of reciprocation, and an active position in which said knife is engaged in said groove in said wheel and drawn thereacross during the movement of said slide from said one to the other of said extreme positions.

13. A machine as defined in claim 12 wherein said cam means comprises
(a) an arm secured at one end to said shaft and having a roller follower on its other end,
(b) a spring connected to said arm and operative constantly to urge said arm in a direction to pivot said shaft and clamp into said operative position, and
(c) a camming surface on said frame engageable with said roller follower upon movement of said slide to said other extreme position to pivot said shaft and clamp to said inoperative position, and to hold said shaft and clamp in said inoperative position during the return movement of said slide from said other to said one position.

References Cited in the file of this patent
UNITED STATES PATENTS

| | | |
|---|---|---|
| 167,920 | Manvel | Sept. 21, 1875 |
| 182,284 | Otis | Sept. 19, 1876 |
| 1,007,951 | Hunter | Nov. 7, 1911 |
| 1,223,826 | Palmer | Apr. 24, 1917 |
| 2,637,150 | McQuary | May 5, 1953 |
| 2,986,850 | Batchelder | June 6, 1961 |